Sept. 27, 1955  C. J. HUGHEY  2,718,790
POWER TRANSMISSION MECHANISM
Filed Sept. 29, 1954
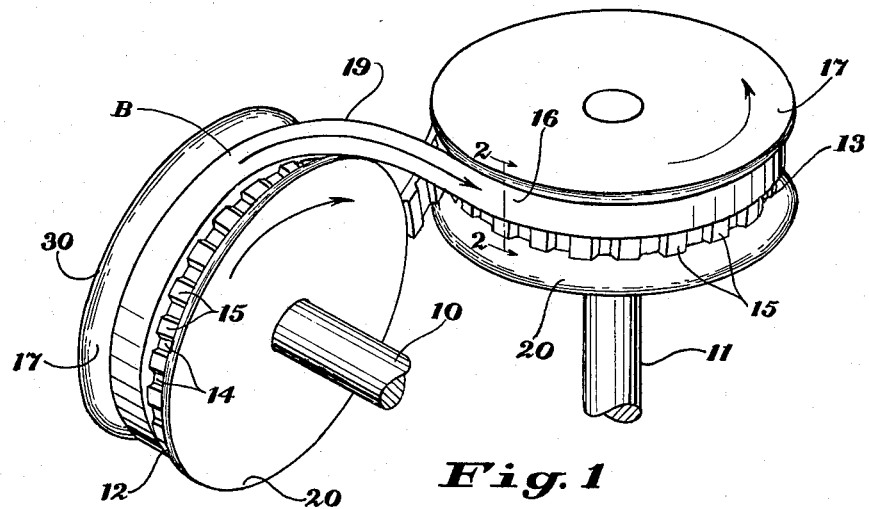
Fig. 1
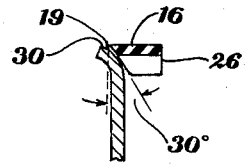
Fig. 2
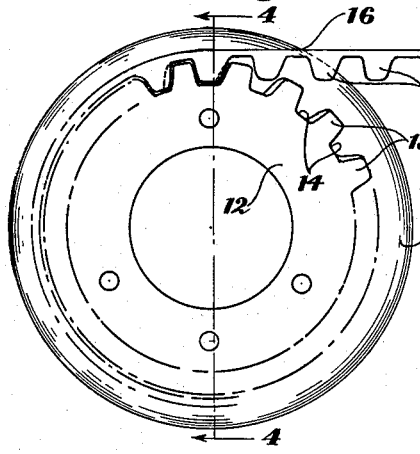
Fig. 3
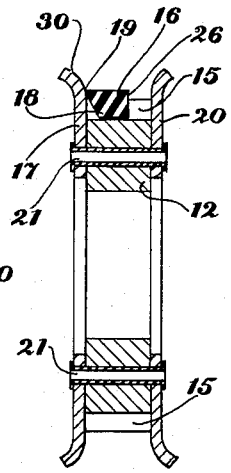
Fig. 4
Fig. 5
Carter J. Hughey
INVENTOR.
BY Daniel D. Mayne
Karl T. Karamof
ATTORNEYS United States Patent Office 2,718,790
Patented Sept. 27, 1955

2,718,790

POWER TRANSMISSION MECHANISM

Carter J. Hughey, Rochester, N. Y., assignor to Eastman Kodak Company, Rochester, N. Y., a corporation of New Jersey Application September 29, 1954, Serial No. 459,056

4 Claims. (Cl. 74—229)

The present invention relates to a positive power transmission mechanism of the belt and pulley type and particularly to such a mechanism capable of right-angle drives at close center distances.

Normally, positive right-angle drives for close center distances are accomplished by means of bevel or helical gears since standard V belt drives require excessive distances between pulley centers to allow for the twist in the belts. Standard V belt drives are not suitable for driving shafts whose relative speeds are critical because of the slipping characteristics inherent in such a friction drive.

I am aware that positive belt and pulley drives have been made possible by the invention of the "timing" belt which is essentially a flat, flexible belt having teeth or projections integrally formed on its inner side which engage in corresponding notches of a pulley in the same manner as a chain and sprocket drive. This "timing" belt and its combination with toothed pulleys are disclosed in U. S. Patents 2,507,852 and 2,397,312, respectively. While this "timing" belt and pulley drive has been successfully used to produce a positive and noiseless drive between two parallel shafts, it has been impossible to satisfactorily use such a drive between two non-intersecting shafts disposed at right angles to one another, and particularly two shafts so related when they are spaced as close as two pulley diameters.

One object of the present invention is to modify the known "timing" belt drive in such a way that it can be used as a drive between two non-intersecting shafts disposed at right angles to one another.

Another object is to provide a positive belt and pulley drive which can be used between shafts disposed at right angles to one another and in which the shafts are substantially as close as two pulley diameters.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawing, in which:

Fig. 1 is a perspective view showing a belt and pulley drive constructed in accordance with a preferred embodiment of the present invention;

Fig. 2 is a sectional detail taken substantially on line 2—2 of Fig. 1;

Fig. 3 is a side elevational view, with one pulley flange removed, and showing the engagement of a pulley and belt constructed in accordance with the present invention;

Fig. 4 is a sectional view taken substantially on line 4—4 of Fig. 3 but showing both flanges on the pulley; and Fig. 5 is an enlarged perspective view of a portion of one of the pulleys and showing the arcuate shape of the teeth thereon.

Referring to the drawings, wherein a preferred embodiment of the present invention is disclosed, mounted on the ends of two non-intersecting shafts 10 and 11, arranged at right angles in this instance, are a pair of pulleys 12 and 13, respectively. The faces or peripheries of these pulleys are each provided with a whole number of equally spaced parallel grooves 14 forming a whole number of equally spaced teeth 15. These pulleys are connected by an endless, flexible "timing" belt 16 having teeth 18 integral with the inner face thereof which have a pitch equal to that of the pulley teeth so that the belt and pulley teeth accurately engage to provide an accurate positive drive. The conventional "timing" belt is a comparatively thin belt of high tensile strength and is made from a composition of fabric and rubber including a load-carrying tension member composed of a single layer of steel wire cable helically wound in a very thin layer of rubber. As is well known, this toothed belt is conducive to a noiseless drive and it is capable of flexing readily.

Assuming that the pulley 13 is the driving pulley and that pulley 12 is the driven pulley, and that they are rotating in the directions indicated by the arrows, the belt 16 will be twisted through 90° and will assume the position as shown by each pulley, see Fig. 1. In order to guide the belt from one pulley to the other, and also to hold the belt on the pulleys, each pulley must have an outer flange 17 which extends radially of the pulley some distance above the top of the teeth thereon. This flange is necessary for guiding the belt onto the pulley and for holding it thereon, and this flange on each of the two pulleys will engage the same edge 19 of the belt. There is no real need for the second flange 20 on each of the pulleys since the belt never engages the same, but it may be added to the pulleys to balance them and give them a more finished appearance. While the flanges 17 and/or 20 may be connected with the pulleys in any suitable manner, I have shown them staked to the end faces of the pulleys by means of tubular rivets 21, see Fig. 4. The advantage of making these flanges separate from the pulleys is to permit the teeth 15 to be cut on the pulley faces by means of conventional gear cutting equipment.

A necessary feature of this drive is that the pulley teeth have a working face whose width is substantially greater than the width of the belt 16 and the teeth 18 thereon. When the drive is operating in the direction shown, the edge 19 of the belt guided onto the pulleys by flanges 17 rides tight against this flange until a point is approached where the belt starts to leave the pulley. At this time the belt starts to move across the pulley teeth and will so move until the belt leaves the pulley. The amount and rate of lateral transition of the belt on the pulley teeth adjacent the point of departure will vary with the spacing between the pulleys and with the angle between the pulley axes. The closer the pulleys and the greater the angle between their axes, the greater will be the amount of transition of the belt and the wider the working face of the pulley teeth will have to be.

According to the present invention, the pulley teeth 15 are made of the form best shown in Fig. 5, rather than in the conventional shape. The pulley teeth 15 and the grooves 14 therebetween are made radial or arcuate, in a manner similar to the teeth on a spiral bevel or hypoid gear, see Fig. 5, where lines 25 are construction lines parallel to the pulley axis. This is done to provide a constant full-face contact with the belt teeth as they enter and leave the pulley. As pointed out above, when the belt 16 first contacts one of the pulleys, it is guided by the flange 17 and stays tight against this flange until at a point B it begins to slide laterally along the pulley teeth as it starts its passage to the second pulley. The radius of each tooth of the pulley is approximately equal to the distance from point B to the point where the belt, or that tooth thereon at point B, leaves the pulley. For reasons pointed out above, this radius of the pulley teeth will vary with the spacing of the pulleys and the angle of intersection of their axes.

It will be noticed that the pulley teeth are curved in the direction of rotation of the pulleys and it is pointed out that the drive will not function properly in a reverse direction to that shown or intended. I have found that the most satisfactory operation is accomplished if the center for the radius of the pulley teeth is located in a plane including the inner face of the flange 17, or in other words, the curvature of the teeth in effect sweeps away from this flange, see Fig. 5.

The teeth 18 on the belt 16 are not curved in correspondence with the pulley teeth but are straight as in conventional "timing" belts. However, since the width of the belt and the teeth thereon is only a fraction of the width of the working face of the pulley teeth, plus the fact that the curvature of the pulley teeth is relatively slight, a substantially constant full-face contact between the belt teeth and the pulley teeth is maintained at all times, even when the belt is moving across the pulley teeth as it approaches its point of departure from the pulley teeth. Without the use of arcuate pulley teeth the spaces between the pulley teeth would have to be increased considerably to compensate for the angle of the belt teeth in respect to the pulley as the belt leaves, and the full-face driving efficiency of the belt would be lost.

To facilitate guiding of the belt onto the pulleys by flanges 17 I propose tapering edge 19 of the belt inwardly, as shown in Figs. 2 and 4. The other side 26 of the belt 16 can be left straight as they are found in conventional "timing" belts because this edge of the belt serves no real function. While the degree of taper given the edge 19 of the belt may vary to some extent depending upon the application, I have found that a 30° taper, as shown, works very satisfactorily for close pulley separations. To further facilitate guiding of the belt onto the pulleys and to cut down wear on edge 19 of the belt, it may be found desirable to roll the outer edge of the pulley flange 17, as shown at 30 in Figs. 2 and 4.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim as new and desire to secure by Letters Patent of the United States is:

1. A positive right-angle power transmission mechanism of the belt and pulley type comprising a driving pulley and a driven pulley having their axes at right-angles and non-intersecting, the periphery of each pulley provided with evenly spaced grooves extending in the direction of its axis forming evenly spaced driving teeth between said grooves; an endless flexible belt having formed as an integral inner part thereof complemental teeth adapted for gear driving engagement with the teeth and grooves of said pulleys, a flange on the side of each pulley at which the belt passes onto said pulleys and against which one side of the belt rides as it passes around said pulleys and until it reaches a point where it starts to pass to the opposite pulley whereupon the belt moves laterally of the working face of the pulley teeth; the belt being appreciably narrower than the width of the pulley and the teeth thereon having straight working faces; the grooves and the teeth formed thereby in the periphery of the pulleys being curved in the direction of rotation of the respective pulleys whereby the belt teeth are adapted to move laterally of the engaged working faces of said pulley teeth and still maintain substantially full-face driving engagement with the pulley teeth during this transition.

2. A positive right-angle power transmission mechanism according to claim 1 characterized by the fact that the rim portion of said pulley flanges are rolled outwardly, and the side of the belt adapted to engage said flanges is tapered inwardly to facilitate guiding of the belt onto the pulley by said flanges.

3. A positive right-angle power transmission mechanism according to claim 1, characterized by the fact that the radius of each tooth in the pulleys is approximately equal to the distance between the point where a given tooth on the belt starts its lateral transition of one of the pulleys and the point where it leaves said pulley in passing to the other pulley.

4. A positive right-angle power transmission mechanism according to claim 1, characterized by the fact that the radius of each tooth in the pulleys is approximately equal to the distance between the point where a given tooth on the belt starts its lateral transition of one of the pulleys and the point where it leaves said pulley in passing to the other pulley, and the center point of said radius is located substantially in the plane of the inside face of said pulley flanges.

References Cited in the file of this patent
UNITED STATES PATENTS

| | | |
|---|---|---|
| 1,105,529 | Newton | July 28, 1914 |
| 2,553,439 | Carmichael | May 15, 1951 |

FOREIGN PATENTS

| | | |
|---|---|---|
| 423,753 | Italy | July 26, 1947 |